United States Patent
Stump et al.

(10) Patent No.: US 11,644,809 B2
(45) Date of Patent: *May 9, 2023

(54) AUTOMATION OBJECTS FOR INTEGRATED DESIGN ENVIRONMENTS

(71) Applicant: Rockwell Automation Technologies, Inc., Mayfield Heights, OH (US)

(72) Inventors: Andrew R. Stump, Mentor, OH (US); Srdjan Josipovic, Montreal (CA); Matthew R. Ericsson, Lyndhurst, OH (US); Michael D. Kalan, Highland Heights, OH (US); Anthony Carrara, Strongsville, OH (US); Christopher W. Como, Chagrin Falls, OH (US); Sharon M. Billi-Duran, Euclid, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,037

(22) Filed: Sep. 13, 2021

(65) Prior Publication Data

US 2021/0405605 A1    Dec. 30, 2021

Related U.S. Application Data

(63) Continuation of application No. 16/144,105, filed on Sep. 27, 2018, now Pat. No. 11,119,463.

(51) Int. Cl.
*G05B 19/05* (2006.01)
*G05B 19/042* (2006.01)

(52) U.S. Cl.
CPC ....... *G05B 19/054* (2013.01); *G05B 19/0426* (2013.01); *G05B 19/052* (2013.01); *G05B 19/056* (2013.01); *G05B 2219/23067* (2013.01)

(58) Field of Classification Search
CPC .. G05B 19/054; G05B 19/052; G05B 19/056; G05B 2219/23067
See application file for complete search history.

(56) References Cited

U.S. PATENT DOCUMENTS

| | | |
|---|---|---|
| 6,931,288 B1 | 8/2005 | Lee et al. |
| 7,324,856 B1 | 1/2008 | Bromley |

(Continued)

FOREIGN PATENT DOCUMENTS

| | | |
|---|---|---|
| EP | 1284446 | 2/2003 |
| EP | 2595510 | 5/2013 |

OTHER PUBLICATIONS

Communication Pursuant to Article 94(3) EPC for EP Application No. 19199711.3, filed Sep. 13, 2021; dated Oct. 28, 2021; 6 pages.

(Continued)

*Primary Examiner* — Christopher E. Everett

(57) ABSTRACT

The present disclosure is directed to systems, methods and devices for facilitating object-based cross-domain industrial automation control. An object library comprising a plurality of objects may be maintained. One or more of the objects may represent physical counterparts for use in an industrial automation process. Each object of the plurality of objects in the object library may have at least one property that an automated control device operation can be programmed to act on. Each object of the plurality of objects may also have at least one property that a human machine interface component can utilize in generating display elements corresponding to the objects for display on the human machine interface. When modifications to objects in the object library are received, those modifications may be automatically deployed and incorporated in controller logic and HMI graphics and control.

20 Claims, 7 Drawing Sheets

(56) References Cited

U.S. PATENT DOCUMENTS

| | | |
|---|---|---|
| 7,809,683 B2 | 10/2010 | Hood et al. |
| 9,128,479 B2 | 9/2015 | Reichard et al. |
| 2004/0075689 A1 | 4/2004 | Schleiss et al. |
| 2005/0027376 A1 | 2/2005 | Lucas et al. |
| 2005/0027377 A1 | 2/2005 | Lucas et al. |
| 2005/0222698 A1 | 10/2005 | Eryurek et al. |
| 2006/0195817 A1 | 8/2006 | Moon |
| 2006/0259500 A1 | 11/2006 | Hood et al. |
| 2007/0132779 A1 | 6/2007 | Gilbert et al. |
| 2008/0127092 A1 | 5/2008 | Tomar |
| 2010/0083232 A1 | 4/2010 | Chouinard et al. |
| 2012/0029661 A1 | 2/2012 | Jones et al. |
| 2014/0129550 A1 | 5/2014 | Weatherhead et al. |
| 2014/0129822 A1 | 5/2014 | Weatherhead et al. |
| 2014/0130012 A1 | 5/2014 | Weatherhead et al. |
| 2016/0109875 A1 | 4/2016 | Majewski et al. |
| 2017/0185594 A1 | 6/2017 | Schulz et al. |

OTHER PUBLICATIONS

U.S. Appl. No. 16/144,171, Non Final Office Action, dated Jun. 8, 2020, pp. 1-43, Alexandria, Virginia, United States.

Borland: "Borland C++ User's Guide", Borland C++ User's Guide, Oct. 31, 1993, pp. 1-462, XP055627917, USA, http://www.bitsavers.org/pdf/borland/borland_C++_Version_4.0_Users_Guide_-Oct. 93.pdf.

European Appl No. 19199672.7, Search Report, Ref. EP124776-AN, dated Feb. 20, 2020, pp. 1-14, Munich, Germany.

European Appl No. 19199711.3, Search Report, Ref. EP124777-AN, dated Jun. 5, 2020, pp. 1-13, Munich, Germany.

European Appl. No. 19199//8.2 Search Report, Ref. EP124781-AN, dated Mar. 27, 2020, 10 pages, Munich, Germany.

U.S. Appl. No. 16/144,073, Notice of Allowance, dated Apr. 1, 2021, 49 pages.

Communication Pursuant to Article 94(3) EPC for EP Application No. 19199711.3, filed Sep. 13, 2021; dated Mar. 15, 2022; 5 pages.

AUTOMATION OBJECTS FOR INTEGRATED DESIGN ENVIRONMENTS

RELATED APPLICATIONS

This application is a continuation of, and claims priority to, U.S. Pat. No. 11,119,463, granted on Sep. 14, 2021, entitled AUTOMATION OBJECTS FOR INTEGRATED DESIGN ENVIRONMENTS, and which is hereby incorporated by reference in its entirety.

BACKGROUND

Two of the core features of an industrial automation process are the industrial controller, which employs controller logic to control hardware components utilized in the automation process, and the human machine interface (HMI), which generates near real-time graphical display elements corresponding to the hardware components and materials used in the automated routines. Entities frequently modify operations that are performed during automated processes (e.g., to make a process more efficient, to make a different product, to make a modified product, etc.), as well as the hardware that implements those operations. When such modifications are made, a software engineer typically has to modify at least one file corresponding to the controller code, and at least one file corresponding to the HMI code, to ensure that the operational and/or hardware modifications are properly integrated in the industrial automation system. Furthermore, when modifications to the controller code and the HMI code are not properly synced, issues may arise in the control of the industrial automation hardware and/or HMI graphics.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential feature of the claimed subject matter, nor is it intended to be used as an aid in determining the scope of the claimed subject matter.

Non-limiting examples of the present disclosure describe systems, methods, and devices for facilitating object-based cross-domain industrial automation control. An object library comprising a plurality of objects may be maintained and accessed by various industrial automation applications. Each of the plurality of objects maintained in the object library may have at least one property that an automated control device operation can be programmed to act on, and at least one property that a human machine interface (HMI) component can utilize in generating display elements corresponding to the objects for display on an HMI. In some examples, the plurality of objects may have one or more additional properties related to automation system analytics, device configuration, security (e.g., role-based policy), documentation (e.g., PDF, JPEG, MIME types), historical logs (e.g., sample period, triggers, calculated values), alarms, batch (e.g., recipe, batch-specific attributes), visualization (e.g., screens, pop-ups), routines, and/or tags. As such, a single object in the object library may be utilized by an industrial control application (a first domain) to, for example, integrate an object type, and logic for controlling that object type, in an automated routine. The same object may be integrated in an HMI application (a second domain) for displaying a graphical representation of that object and interacting with hardware components associated with the object in the automated routine. When objects are removed, added, and/or modified in the object library, those changes can be automatically deployed to the automated control application files and HMI application files that incorporate the objects.

DETAILED DESCRIPTION

Figure 1:
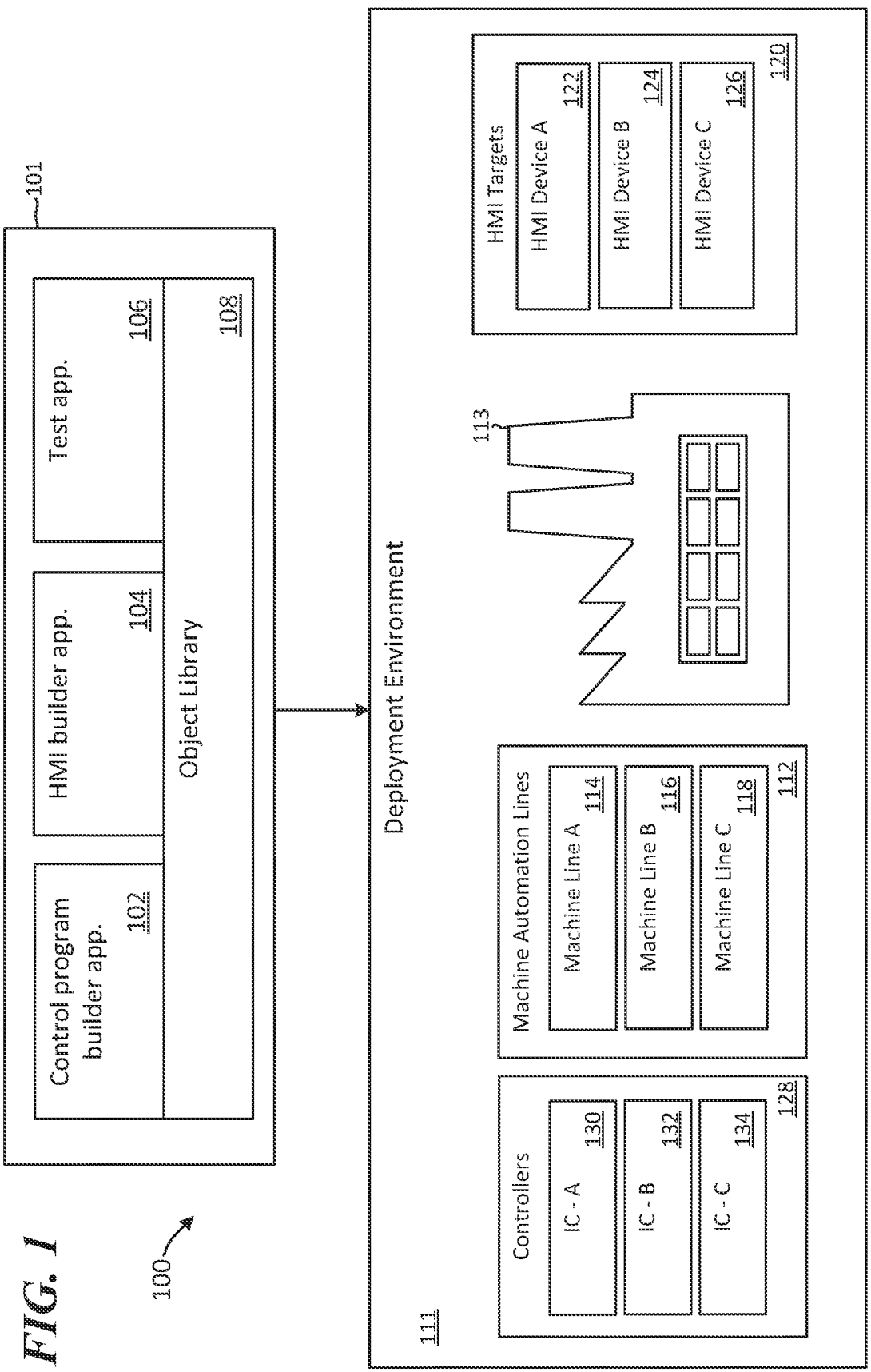
FIG. 1 is a schematic diagram of an exemplary distributed computing environment for facilitating object-based cross-domain industrial automation control.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Generally, the present disclosure is directed to systems, methods and devices for facilitating object-based cross-domain industrial automation control. An object library comprising a plurality of automation objects that have instances of compiled counterparts in various hardware components of the industrial automation system may be maintained. The object library may be accessible to industrial automation applications, including industrial control applications (applications for building, modifying, and implementing industrial controller logic), HMI applications (applications for building HMI graphics and controlling automated routines via HMI graphics), and industrial routine testing applications. Software objects in the object library may have layers and/or properties that are shared amongst the various industrial automation applications. For example, an object for a specific object type implemented in an automated process (e.g., a specific type of pump, belt, valve, or sensor utilized in an automated routine) may have physical properties and/or documentation associated with it that can be utilized by the industrial control application types as well as the HMI application types. As such, it is not necessary to create multiple software objects for each hardware object in an automated routine (e.g., a first software object does not need to be created for the controller application types, with a corresponding second software object having to be created for the HMI application types). Similarly, when modifications to objects are made, those modifications are automatically deployed to the HMI application types and the controller application types rather than having to modify two or more objects corresponding to each application or application type.

The current disclosure provides technical advantages over prior solutions. For example, computer processing costs (CPU cycles) are reduced through implementation of the current invention because the need to create two separate software objects for a single physical component of an industrial automation process is done away with. That is, separate software objects representing a hardware object for both the HMI application environment and the control application environment is no longer necessary, as a single object, which is executable by both application types, is disclosed herein. The same is true for other application types and documents that software objects may be applied to and/or integrated in (e.g., testing applications, documents of various types). Processing costs are also saved due to only a single set of modifications needing to be applied when, for example, a new hardware component is added, removed, or modified in an automated routine. Those changes may be applied to a single object in the object library and automatically deployed to both the HMI application environment and the control application environment, rather than having to make the same modifications to two separate objects. Storage costs are also reduced by the mechanisms described herein, as it is unnecessary to store different software objects corresponding to a same hardware object for both the HMI application environment and the control application environment. Additionally, the cost to end-user time and resources is reduced by eliminating the need to manually edit and deploy each application type when modifications are made to object-type components therein. Rather, according to mechanisms described herein, software objects that can be represented in each of a plurality of application types may be simultaneously deployed to each of the plurality of application types when modifications are made at the object level without requiring manual modifications.

FIG. 1 is a schematic diagram of an exemplary distributed computing environment 100 for facilitating object-based cross-domain industrial automation control. Computing environment 100 includes automated industrial process software build sub-environment 101, machine automation lines sub-environment 112, HMI targets sub-environment 120, and controllers sub-environment 128. Any and all of the computing devices with regard to the various distributed computing environments described herein may communicate with one another via one or more wired or wireless networks. In some examples, controller sub-environment 128, machine automation lines sub-environment 112, and/or HMI targets sub-environment 120, may be deployed together in an industrial automation process factory setting, such as in factory 113 in deployment environment Automated industrial process software build sub-environment 101 includes control program builder application 102, HMI builder application 104, and test application 106, although other industrial automation applications are contemplated. Automated industrial process software build sub-environment 101 also includes object library 108, which comprises a plurality of automated software objects that one or more of the applications in industrial process software build sub-environment 101 may share and/or access. In some examples, object library 108 may be stored locally on one or more computing devices associated with any of control program builder application 102, HMI builder application 104 and/or test application 106. In other examples, object library 108 may be located remotely (e.g., in cloud storage), and one or more computing devices executing control program builder application 102, HMI builder application 104, and/or test application 106, may access object library 108 via a wired or wireless network.

Control program builder application 102 comprises an application for building industrial automation software modules (e.g., single automation control device files, multiple automation control device files) for execution by one or more industrial controllers (e.g., industrial controller—A 130, industrial controller—B 132, industrial controller—C 134) in the performance of routines of an automated industrial process. In some examples, the industrial automation software modules that may be built using control program builder application 102 may comprise ladder logic, function block diagram, sequential function chart, structured text, instruction list, C, and C++, among other software forms.

A ladder logic software module may comprise one or more ladder logic statements, referred to as rungs or instructions. The ladder logic statements define relationships between an output variable and one or more input variables. Input variables are variables that correspond to signals at input terminals and output variables are variables that correspond to signals at output terminals. In relay ladder logic, the input and output signals may be represented graphically as contact symbols and coil symbols arranged in a series of rungs spanning a pair of vertical power rails. A typical ladder logic statement may indicate that a specific output variable is "on" if and only if a first and second input is "on". The ladder logic software module, executed by one or more industrial controllers, manipulates single-bit input and output data representing the state of sensing and operating devices, such as devices machine automation lines sub-environment 112 (e.g., machine line A 114, machine line B 116, machine line C 118) in a factory setting. The ladder logic software module, executed by the one or more industrial controllers, also performs arithmetic operations, timing and counting functions and more complex processing operations. As noted above, however; a controller logic may be created in other software languages, and at its core, the logic functions by taking in inputs from field devices, performing calculations and operations on those inputs, and writing outputs for controlling the field devices based on the calculations.

HMI builder application 104 is an application for building industrial automation software modules (e.g., single HMI configuration files, multiple HMI configuration files) for execution on HMI devices in HMI targets sub-environment 120, which may include typical HMI devices such as dedicated HMI panels, as well as deployment of automation visualization interfaces on computing devices such as smart phones and tablets. An HMI typically receives, via one or more controllers, and processes the status data from devices performing various routines in an industrial automation process (e.g., devices in machine automation lines sub-environment 112, which are deployed in factory 113). An HMI processes, utilizing one or more industrial automation software modules built in HMI builder application sub-environment 104, the status data to generate various graphical displays, which may indicate the current and historical performance of the machines. For example, an HMI graphical display might indicate status metrics of a drive, the pressure of a pump, the speed of a motor, or the output of a robot, each of which may be performing operations that are part of a routine executed in machine automation lines sub-environment 112, controlled from one or more industrial controllers in controllers sub-environment 128.

Test application 106 may perform one or more operations associated with loading industrial automation software modules into virtualized industrial controllers and running one or more industrial automation routines encoded as instructions in the software modules on the virtualized industrial controllers. Test application 106 may utilize the properties of various objects from object library 108 employed in the execution of one or more routines to determine whether new industrial automation software controller modules created in control program builder application 102 perform as desired. Test application 106 may also utilize the properties of various objects from object library 108 employed in the execution of one or more routines to determine whether new industrial automation software HMI modules created in HMI builder application 104 perform as desired. If bugs or unintended issues arise in the testing of one or more routines, test application 106 may identify an object and or software module associated with the problem and flag it for review.

The industrial controllers in controllers sub-environment 128 (industrial controller—A 130, industrial controller—B 132, and industrial controller—C 134) are special purpose computers used for controlling factory devices performing one or more routines in machine automation lines sub-environment 112. Under the direction of one or more industrial automation software modules (e.g., industrial automation software modules built by control program builder application 102), a processor of an industrial controller examines a series of inputs reflecting the status of a controller process or device and changes outputs affecting control of the controlled process or device. The industrial controllers in controllers sub-environment 128 may be constructed in modular fashion to accommodate different application types requiring different numbers and types of input/output (I/O) circuits as is determined by the particular device or process being controlled.

Industrial automation software modules may be delivered to the industrial controllers in source format, token format, object code or executable code. These modules can bind to and use hardware, firmware and/or operating system resources of the industrial controllers. Loadable libraries may be provided to the industrial controllers during runtime to extend functionality and/or provide desired fixes. The stored industrial automation software modules run in real-time or near real-time to provide outputs to the control processes as electrical signals to outputs such as actuators and the like. The outputs are based on the logic of an industrial automation software module and inputs received from sensors of a controlled process being performed in machine automation lines sub-environment 112 in a factory such as in factory 113. One or more industrial controllers may be involved in the performance of routines in machine automation lines sub-environment 112, and the industrial controllers involved in those routines may communicate with the various devices performing those routines via local connections, such as by ethernet, or over a wireless network.

One or more of the industrial controllers in controllers sub-environment 128 may comprise programmable logic controllers (PLCs), which execute a series of operations that are performed sequentially and repeatedly. In general, the series of operations includes an input scan, a program/module scan and an output scan. During the input scan the PLC examines the on or off state of the external inputs and saves these states temporarily in memory. During the program/module scan the PLC scans the instruction of the program/module and uses the input status to determine if an output will be energized. The output results are then saved to memory. During the output scan the controller will energize or de-energize the outputs based on the output results stored in memory to control the external devices.

The computing devices in computing environment 100 utilize object-oriented programming techniques. Additionally, the various sub-environments in computing environment 100 may utilize shared object programming techniques whereby objects in object library 108, and the objects' properties, are shared amongst software modules (e.g., HMI software modules in HMI targets sub-environment 120, controller software modules in controllers sub-environment 128). Object oriented programming shifts the emphasis of software development away from function decomposition and towards the recognition of units of software called "objects" which encapsulate both data and functions. Object oriented programming objects are software entities comprising data structures and operations on data. Together, these elements enable objects to model virtually any real-world entity in terms of its characteristics, represented by its data elements, and its behaviors represented by its data manipulation functions. In this way, objects can model concrete things like physical components of automated industrial processes (e.g., pumps, belts, filters, tanks, computers), and they can model abstract concepts like numbers or geometrical concepts (e.g., flow rate values, tank volumes, connection types).

Each object in object library 108 may comprise a set of data (e.g., attributes) and a set of operations (e.g., methods), that can operate on the data. Each object in object library 108 may additionally or alternatively comprise a set of renderings that can display a set of data, self-describing documentation, one or more graphs that trace object data, and/or a set of configurations that provide alarms related to the data. Methods in an object are invoked by passing a message to the object. The message specifies a method name and an argument list. When the object receives the message, code associated with the named method is executed with the formal parameters of the method bound to the corresponding values in the argument list. Methods and message passing in object oriented programming are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object in object library 108 represents a class of some control element. A class includes a set of data attributes plus a set of allowable operations (e.g., methods) on the data attributes. Object oriented programming supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. One or more objects in object library 108 may comprise complex objects built from multiple instances of similar objects. Systems, methods and devices described herein may employ abstract object classes, which are designs of sets of objects that collaborate to carry out a set of responsibilities. Frameworks are essentially groups of interconnected objects and classes that provide a prefabricated structure for a working application. Additional description related to the objects and their implementation in the current invention is provided in relation to FIG. 2.

Figure 2:
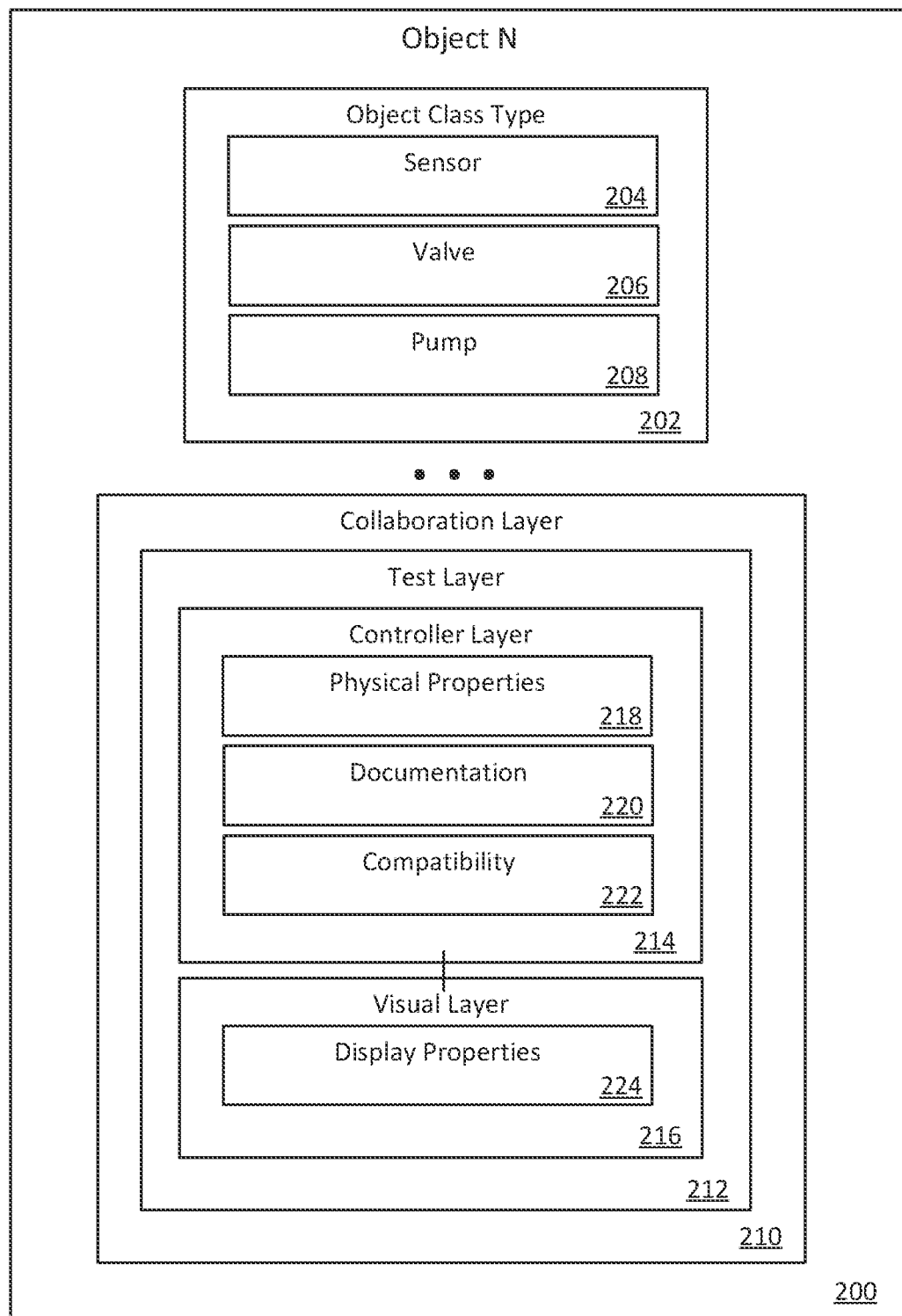
FIG. 2 is a simplified block diagram of an exemplary automation software object and its various components, which may be utilized in the control and visualization of industrial automation processes.

FIG. 2 is a simplified block diagram of an exemplary automation software object 200 and its various components, which may be utilized in the control and visualization of industrial automation processes and routines. Object 200 is an automation software object that may be included as part of a software object library, such as object library 108. In some examples, object 200 may be incorporated in controller software modules for execution by one or more industrial controllers for controlling operations associated with automated industrial processes and routines, and/or virtualized industrial controllers for virtually controlling operations associated with automated industrial processes and routines. In additional examples, object 200 may be incorporated in HMI software modules for execution by one or more HMIs for generating various graphical displays, which may indicate the current and historical performance of the machines associated with automated industrial processes and routines. In additional examples, object 200 may be incorporated in both HMI software modules and controller software modules.

Object 200 comprises a class type 202. While various class types are possible for assignment to object 200, for exemplary purposes, object 200 is indicated as having one of a sensor class type 204, a valve class type 206, or a pump class type 208 assigned to it. The class types depicted in the object class type 202 element each correspond to a common hardware type in industrial automation processes, and they are provided for exemplary purposes; however, users may also create their own class types, which may correspond to combinations of product types and/or product skids (e.g., combinations of devices for performing various automation routines). Additionally, although broad class types are shown for ease of example, each class type may have sub-class types as well (e.g., specific types of sensors, valves, pumps, controllers, displays, etc.), for which more exact specifications may be associated with object 200.

Object 200 also includes collaboration layer 210, test layer 212, controller layer 214, and visual layer 216. Controller layer 214 comprises a plurality of properties and property types, including physical properties 218, documentation properties 220, and compatibility property type 222. In some examples, controller layer 214 may also comprise controller code and/or properties.

Documentation properties 220 may include information about the specific object type specified in object class type 202. For example, if object 200 is a specific brand and type of valve, documentation properties 220 may specify the name of the manufacturer of the valve, actions that may be performed by the valve, operating pressures that the valve can withstand, operating temperatures that the valve can withstand, flow rate, etc. If object 200 is a specific brand and type of temperature sensor, documentation properties 220 may specify the name of the manufacturer of the sensor, temperature range of the sensor, accuracy range of the sensor, scan frequency of the sensor, etc. If object 200 is a specific brand and type of pump, documentation properties 220 may specify the name of the manufacturer of the pump, maximum discharge flow for the pump, maximum discharge pressure for the pump, operating temperatures that the pump can withstand, horsepower for the pump, etc.

Compatibility properties 222 may also include information about the specific object type specified in object class type 202. For example, if object 200 is a specific brand and type of valve, compatibility properties 222 may specify types of service the valve is intended to handle (e.g., air, gas, liquid, vacuum), connection types, etc. If object 200 is a specific brand and type of temperature sensor, compatibility properties 222 may specify types of environments it is intended to handle (e.g., air, gas, liquid, vacuum), connection types, etc. If object 200 is a specific brand and type of pump, compatibility properties 222 may specify types of service the pump is intended to handle (e.g., types of fluid), connection types, etc.

Physical properties 218 include the physical specifications (e.g., size, geometry, mass, material etc.) of object 200.

Visual layer 216 includes display properties, which in association with one or more physical properties 218, documentation properties 220, and/or compatibility properties 222, may be utilized to accurately generate display components in real-time corresponding to components operating in an industrial automation routine. For example, display properties 224 may include various color properties for types of liquid and gas in an industrial automation routine, and when data from pumps, sensors and tanks from the routine are processed by the HMI and/or an industrial controller, those physical properties may be translated with the appropriate color types for the liquid and/or gas involved in the routine for graphically displaying the current state of the routine.

Controller layer 214 comprises a plurality of industrial controller-oriented operations/methods that may be performed by an industrial controller utilizing one or more properties of object 200, such as physical properties 218, documentation properties 220, compatibility properties 222, and/or display properties 224 (in association with visual layer 216). The operations performed by the industrial controller utilizing instructions associated with controller layer 214 direct hardware components of industrial automation processes to perform actions associated with ladder logic routines via various I/O communications as more fully described above.

Test layer 212 comprises a plurality of industrial controller-oriented operations/methods that may be performed by a virtual industrial controller utilizing one or more properties of object 200. The test layer may be associated with the performance of test script operations on object 200 that a typical industrial controller would be expected to perform, while flagging failed operations or operations that lead to unexpected results. Test layer 212 may also include a plurality of HMI-oriented operations/methods that may be performed by an HMI or virtualized HMI utilizing one or more properties of object 200, including display properties 224, physical properties 218, documentation properties 220, and/or compatibility properties 222.

Collaboration layer 210 comprises a plurality of operations/methods that may be performed on one or more properties of object 200. The collaboration operations/methods permit multi-user access to a control project, including centralized control, message coding from one user to another, collaborative development of industrial automation projects, such as collaborative development of application code for an industrial controller or design of an industrial automation process system. According to some examples, operations associated with collaboration layer 210 may provide mechanisms for users to leave notes for one another in association with objects and/or industrial automation projects that objects are included in. In additional examples, the operations associated with collaboration layer 210 may provide mechanisms for users to flag issues associated with development of industrial automation projects. In some examples, the operations associated with collaboration layer 210 may provide for cross-domain collaboration (e.g., a first user may leave a note related to an object while working with the object in HMI code and the note may be surfaced to a second user in relation to the same object in controller code that the second user is working on). In other examples, the operations associated with collaboration layer 210 may provide for same-domain collaboration (e.g., a first user may leave a note related to an object in a first area and/or routine of controller code and the note may be surfaced to a second user in relation to the same object in a second area and/or routine of controller code that the second user is working on).

Figure 3:
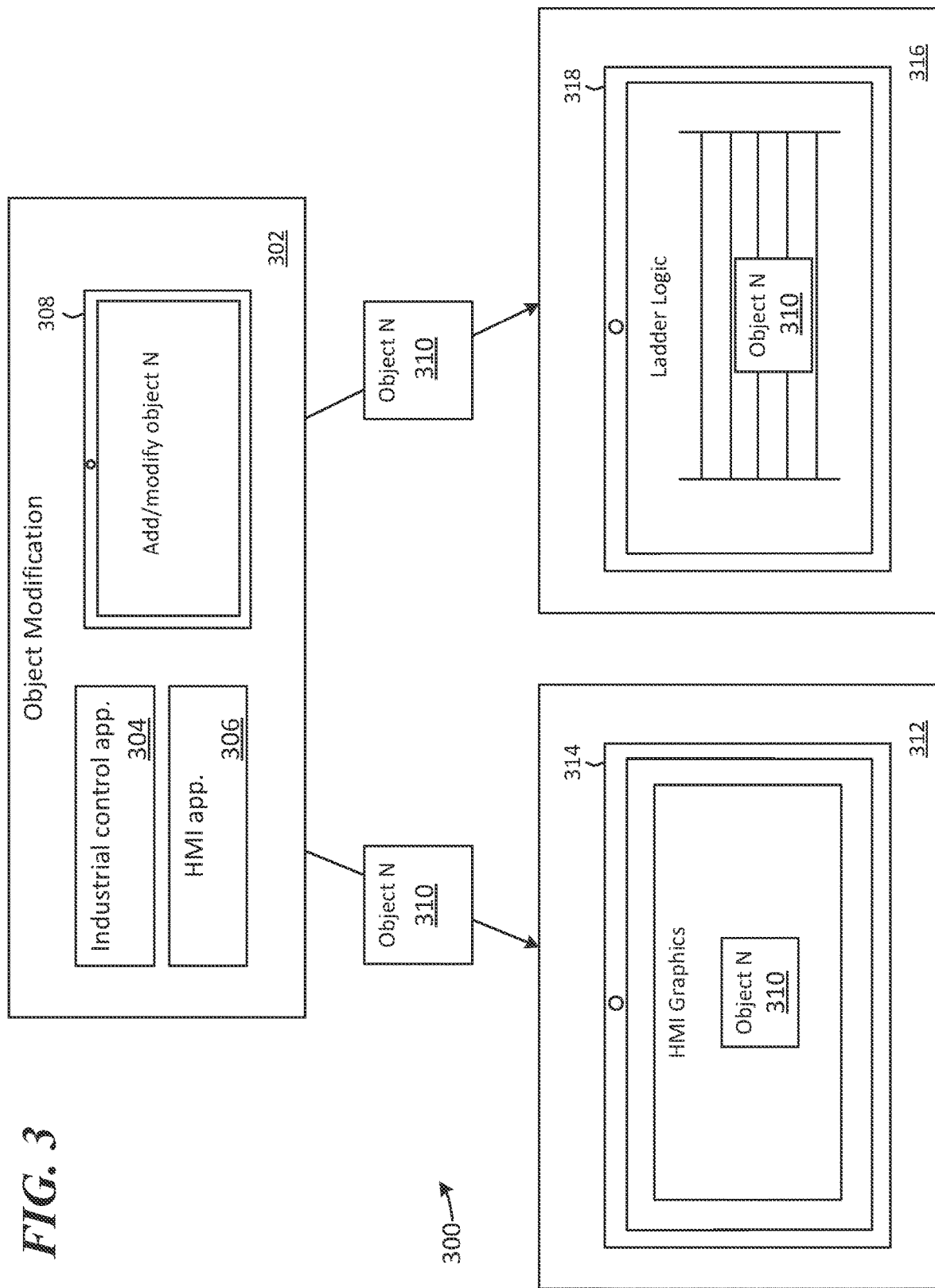
FIG. 3 is a simplified block diagram of an exemplary environment for updating industrial controller logic and an HMI deployment in response to modifying a shared object.

FIG. 3 is a simplified block diagram of an exemplary environment 300 for updating industrial controller logic and an HMI deployment in response to modifying a shared object. Exemplary environment 300 includes object modification sub-environment 302, HMI graphics sub-environment 312 and industrial controller logic sub-environment 316.

Object modification sub-environment 302 includes computing device 308, which is utilizing an industrial automation application to add or modify automation object 310. In some examples, the industrial automation application utilized to add or modify automation object 310 may comprise industrial control application 304 and/or HMI application 306. Industrial control application 304 may generally be utilized for creating and modifying industrial controller logic implemented in industrial automation processes, and HMI application 306 may generally be utilized in creating and modifying HMI graphics, and graphical commands, related to the execution of industrial automation processes.

Automation object 310, whether it is being modified or newly created via computing device 308, is deployed in at least one routine of an industrial automation process. Automation object 310 is a cross-domain object, having a visual layer and an controller layer, which has shared properties that may be utilized by HMI application 306 to generate graphics corresponding to an industrial automation process that automated object 310 is deployed in, and by industrial control application 304 to generate control logic/code corresponding to an industrial automation process that automated object 310 is deployed in. Automation object 310 may comprise one or more additional layers, including test layer 314 and/or collaboration layer 212, as discussed above in relation to FIG. 2.

Automation object 310, whether it is being created or modified, may be stored in an object library, such as object library 108 in FIG. 1. In this example, upon modification or creation, automation object 310 is incorporated in HMI application 306 for use in generating HMI graphics for one or more routines that automation object 310 has been associated with in object modification sub-environment 302. The incorporation of automation object 310 to HMI application 306 is illustrated with reference to computing device 314 in HMI graphics sub-environment 312. As a basic example, if automation object 310 corresponds to a new tank or valve component of a new type, with different specifications, that is replacing an existing tank or valve component in an existing automated routine, the graphical representation of that tank or valve component would likewise be modified in its graphical display in HMI application 306 due to the modification to automation object 310.

Additionally, in this example, upon modification or creation, automation object 310 is also incorporated in industrial control application 304 for use in modifying the industrial controller logic associated with one or more routines that automation object 310 has been associated with in object modification sub-environment 302. In other examples, rather than modifying an automation routine due to an object modification, a routine may simply act on physical hardware corresponding to the modified object. The deployment of automation object 310 to industrial control application 304 is illustrated with reference to computing device 318 in industrial controller sub-environment 316. As a basic example, if automation object 310 corresponds to a new tank or valve component of a new type, with different specifications, that is replacing an existing tank or valve component in an existing automated routine, the ladder logic for controlling that tank or valve component may likewise also be modified due to its different specifications compared with the previously employed model.

Figure 4:
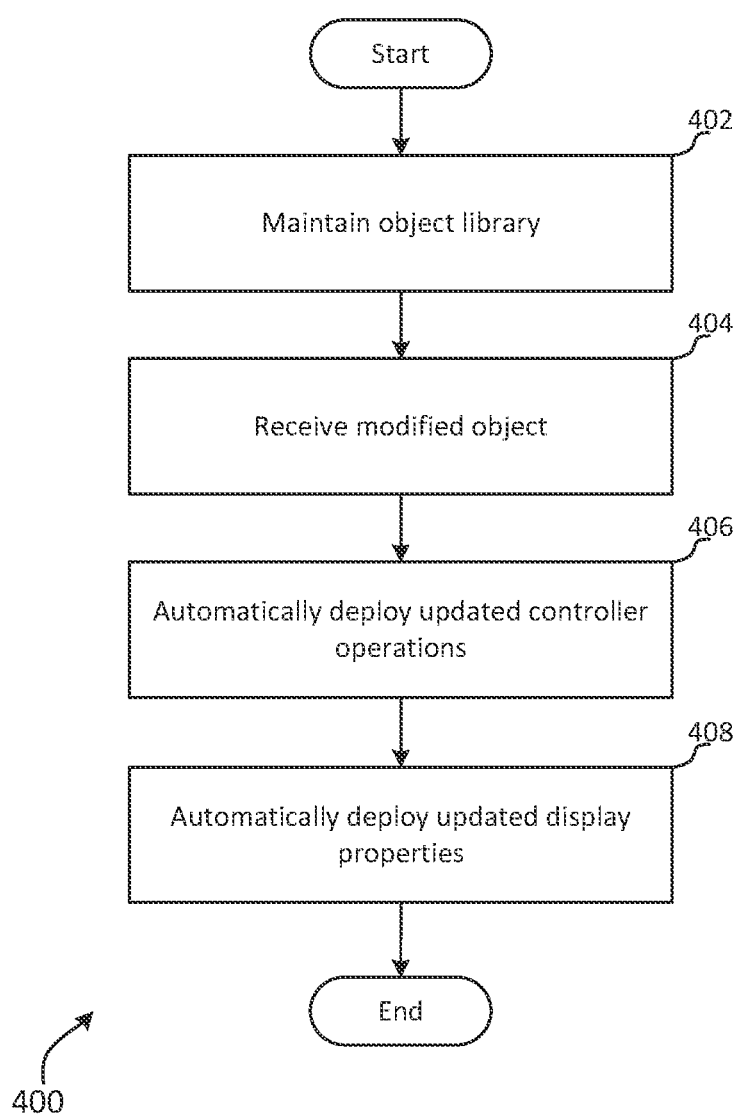
FIG. 4 illustrates an exemplary method for facilitating object-based cross-domain industrial automation control.

FIG. 4 illustrates an exemplary method 400 for facilitating object-based cross-domain industrial automation control. The method 400 begins at a start operation and flow moves to operation 402

At operation 402 an object library is maintained. The object library may be maintained in association with one or more industrial automation applications (e.g., an industrial control application, an HMI application, a test application). In some examples, the object library may comprise a cloud-based library that is accessed by one or more industrial automation applications via a network. In other examples, the object library may be stored all or in part on client computing devices on which the industrial automation applications are running.

From operation 402 flow continues to operation 404 where a modified version of the automation object is received by the object library. In some examples, receiving the modified version of the automation object may comprise receiving a completely new object that replaces a previously existing automation object in the object library (e.g., a new object is created that has different properties and/or a different object class associated with it than a previously existing automation object that it is replacing/modifying). In other examples, receiving the modified version of the automation object may comprise receiving a modification to an existing automation object in the library (e.g., receiving a property value modification to an existing automation object, changing the object class or sub-class type for an existing automation object).

From operation 404 flow continues to operation 406 where updated industrial controller operations are automatically deployed to a logic controller based on the modification to the automation object. In some examples, the modified object may be automatically deployed, upon its modification, to an industrial control application for incorporation in automated routines that the previous version of the automation object was deployed in. In other examples, the modified object may be deployed, when a user explicitly indicates, to an industrial control application for incorporation in automated routines that the previous version of the automation object was deployed in.

In specific examples, if the modification of the object comprises specification modifications for one or more hardware components associated with an industrial automation routine, when the modification to the automation object is received, controller logic associated with the previous version of the automation object may be automatically updated to adjust to the modified object. For example, if valve specifications for a valve object are modified, ladder logic that incorporates the new valve may be modified to compensate for that modification (e.g., size modifications for a valve object may result in flow rate changes in ladder logic, size modification for a valve object may result in timing changes in ladder logic).

From operation 406 flow continues to operation 408 where updated display properties for the automated object are automatically deployed to an HMI component based on the modification to the automation object. In some examples, the modified object may be automatically deployed, upon its modification, to an HMI application, such as HMI application 306, for generating display elements associated with industrial automation routines, and controlling automated routines from HMI interfaces, that the previous version of the automation object was deployed in. In specific examples, if the modification of the object comprises specification modifications (e.g., size properties, class type properties, etc.) for one or hardware components associated with an industrial automation routine, when the modification the automation object is received, HMI graphics for the automation object corresponding to those modified specifications may be automatically updated in the HMI application.

In examples where an object being modified does not already exist in an automated routine, the newly modified object may be available for incorporation into new routines from the object library. For example, when an object from the object library is modified, or a new object is added to the object library, the object and its properties may become available for use by a control program builder application, such as control program builder application 102; an HMI builder application, such as HMI builder application 104; and/or a test application, such as test application 106.

From operation 408 flow continues to an end operation and the method 400 ends.

Figure 5:
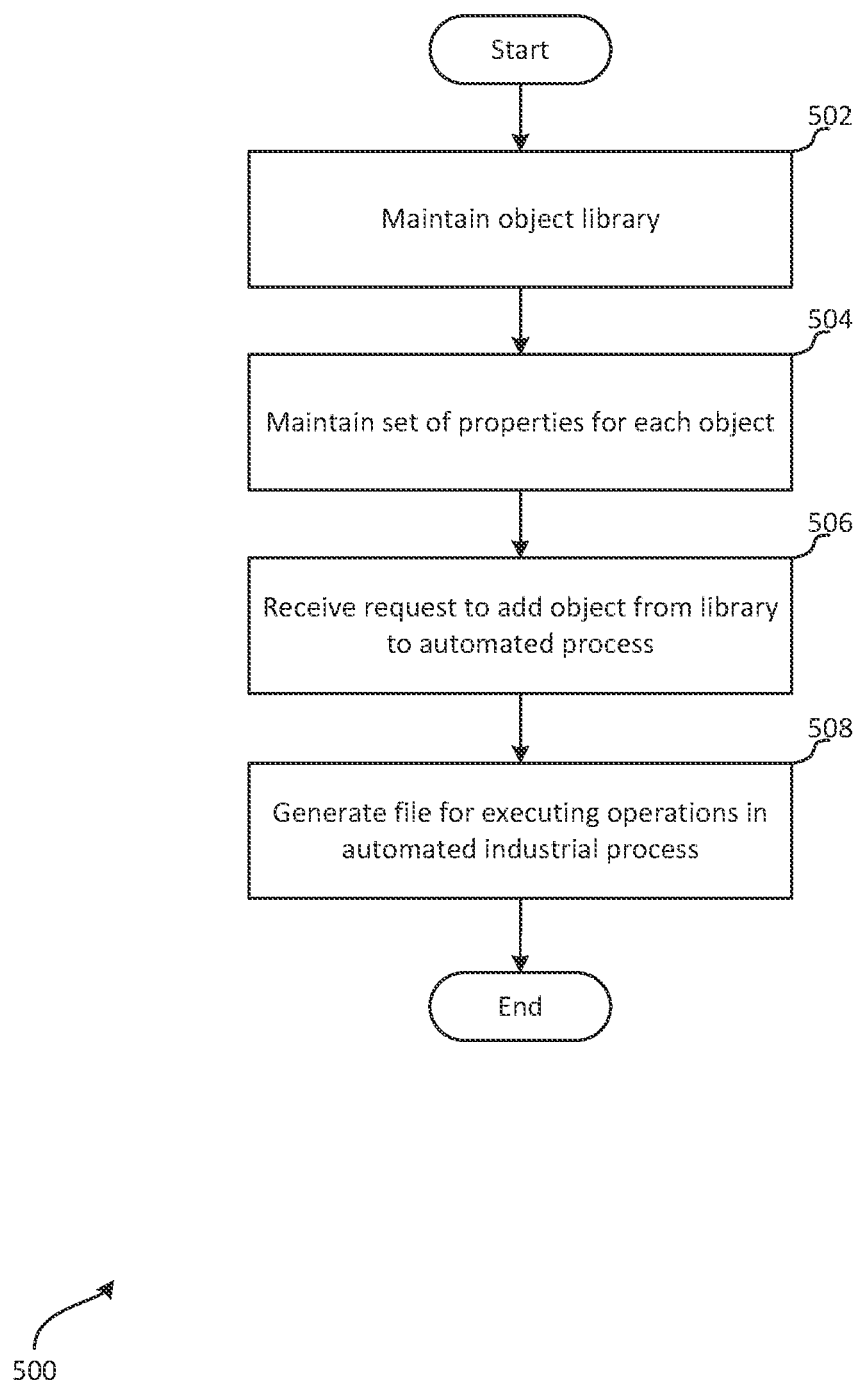
FIG. 5 illustrates another exemplary method for facilitating object-based cross-domain industrial automation control.

FIG. 5 illustrates another exemplary method 500 for facilitating object-based cross-domain industrial automation control. The method 500 begins at a start operation and flow moves to operation 502.

At operation 502 an object library comprised of a plurality of objects that have physical counterparts for use in an automated industrial process is maintained. The object library may be maintained in association with one or more industrial automation applications (e.g., an industrial control application, an HMI application, a test application). In some examples, the object library may comprise a cloud-based library that is accessed by one or more industrial automation applications via a network. In other examples, the object library may be stored all or in part on client computing devices on which the industrial automation applications are running.

From operation 502 flow continues to operation 504 where a set of properties for each object is maintained. The set of properties for a given object may link that object with an automated control device programming environment and an HMI environment. For example, physical properties, documentation properties, and/or compatibility properties associated with an object may determine how a hardware component corresponding to the object can be controlled via an industrial controller from an automated control device programming environment, while at the same time, one or more of those same properties may be utilized by an HMI environment for determining which graphical elements should be generated by an HMI application for representing the hardware component.

From operation 504 flow continues to operation 506 where a request to add an object from the object library into an automated industrial process is received. In some examples, the request may be received via an industrial control application. In other examples, the request may be received via an HMI application. In still other examples, the request may be received via a test application for testing industrial automation routines. In some examples, the request may be received via a system-level tool that integrates the object from the object library with each application component that it can be applied in. The request may comprise a request to add an entirely new object, corresponding to an entirely new piece of hardware in an automated routine, to the automated industrial process. For example, the request may correspond to adding an additional tank of a new or existing type to an existing automated routine. In other examples, the request may comprise a request to modify an existing object in an automated routine (e.g., replace an existing tank in a routine with a new tank, replace an existing sensor in a routine with a new sensor).

From operation 506 flow continues to operation 508 where a file for executing one or more operations in an automated industrial process by an automated control device is generated based on one or more properties associated with the object in the object library. For example, the file, depending on the object properties of the new object, may be generated to include various timing information, flow rate information, temperature information, voltage information, etc. incorporated in a controller logic file for one or more operations of an industrial automation routine and process that the object is utilized in.

From operation 508 flow continues to an end operation and the method 500 ends.

Figure 6:
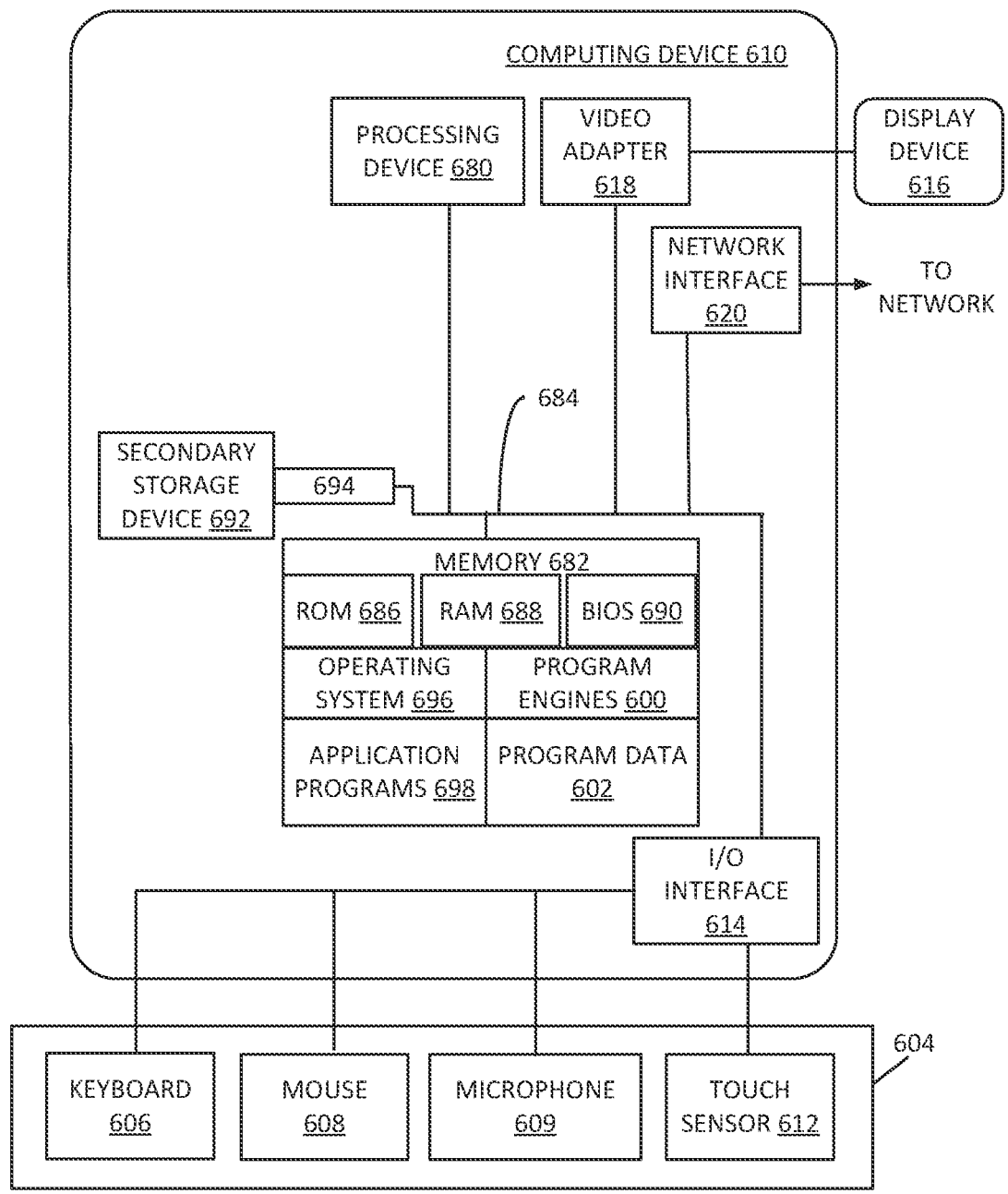
FIG. 6 is a block diagram illustrating example physical components (e.g., hardware) of a computing device with which aspects of the disclosure may be practiced.

FIG. 6 illustrates one aspect in which an exemplary architecture of a computing device according to the disclosure that can be used to implement aspects of the present disclosure, including any of the plurality of computing devices described herein with reference to the various figures and their corresponding descriptions. The computing device illustrated in FIG. 6 can be used to execute the operating system, application programs, and software modules (including the software engines) described herein, for example, with respect to FIG. 7 and program engines 714, joint rendering engine 716, module splitting engine 718, test engine 720, collaboration engine 722, and location determination engine 724. By way of example, the computing device will be described below as the industrial automation computing device 610. To avoid undue repetition, this description of the computing device will not be separately repeated for each of the other computing devices described herein, but such devices can also be configured as illustrated and described with reference to FIG. 6.

The computing device 610 includes, in some embodiments, at least one processing device 680, such as a central processing unit (CPU). A variety of processing devices are available from a variety of manufacturers, for example, Intel, Advanced Micro Devices, and/or ARM microprocessors. In this example, the computing device 610 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 610 include a server computer, a programmable logic controller computer, a desktop computer, a laptop computer, a tablet computer, a mobile computing device (such as a smart phone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 610, such as during start up, is typically stored in the read only memory 686.

The computing device 610 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program engines), data structures, and other data for the computing device 610. Details regarding the secondary storage devices 692 and their associated computer readable media, as well as their associated nonvolatile storage of computer readable instructions (including application programs and program engines) will be more fully described below with reference to FIG. 7.

Although the exemplary environment described herein employs a hard disk drive as a secondary storage device, other types of computer readable storage media are used in other aspects according to the disclosure. Examples of these other types of computer readable storage media include magnetic cassettes, flash memory cards, digital video disks, Bernoulli cartridges, compact disc read only memories, digital versatile disk read only memories, random access memories, or read only memories. Additional aspects may include non-transitory media. Additionally, such computer readable storage media can include local storage or cloud-based storage.

A number of program engines can be stored in secondary storage device 692 or memory 682, including an operating system 696, one or more application programs 698, other program engines 600 (such as the software engines described herein), and program data 602. The computing device 610 can utilize any suitable operating system, such as Linux, Microsoft Windows™, Google Chrome™, Apple OS, and any other operating system suitable for a computing device.

According to examples, a user provides inputs to the computing device 610 through one or more input devices 604. Examples of input devices 604 include a keyboard 606, mouse 608, microphone 609, and touch sensor 612 (such as a touchpad or touch sensitive display). Additional examples may include other input devices 604. The input devices are often connected to the processing device 680 through an input/output interface 614 that is coupled to the system bus 684. These input devices 604 can be connected by any number of input/output interfaces, such as a parallel port, serial port, game port, or a universal serial bus. Wireless communication between input devices and the interface 614 is possible as well, and includes infrared, BLUETOOTH® wireless technology, cellular and other radio frequency communication systems in some possible aspects.

In an exemplary aspect, a display device 616, such as a monitor, liquid crystal display device, projector, or touch sensitive display device, is also connected to the system bus 684 via an interface, such as a video adapter 618. In addition to the display device 616, the computing device 610 can include various other peripheral devices (not shown), such as speakers or a printer.

When used in a local area networking environment or a wide area networking environment (such as the Internet), the computing device 610 is typically connected to a network through a network interface 620, such as an Ethernet interface. Other possible embodiments use other communication devices. For example, certain aspects of the computing device 610 may include a modem for communicating across the network.

The computing device 610 typically includes at least some form of computer readable media. Computer readable media includes any available media that can be accessed by the computing device 610. By way of example, computer readable media include computer readable storage media and computer readable communication media.

Computer readable storage media includes volatile and nonvolatile, removable and non-removable media implemented in any device configured to store information such as computer readable instructions, data structures, program engines or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 610. Computer readable storage media does not include computer readable communication media.

Computer readable communication media typically embodies computer readable instructions, data structures, program engines or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Figure 7:
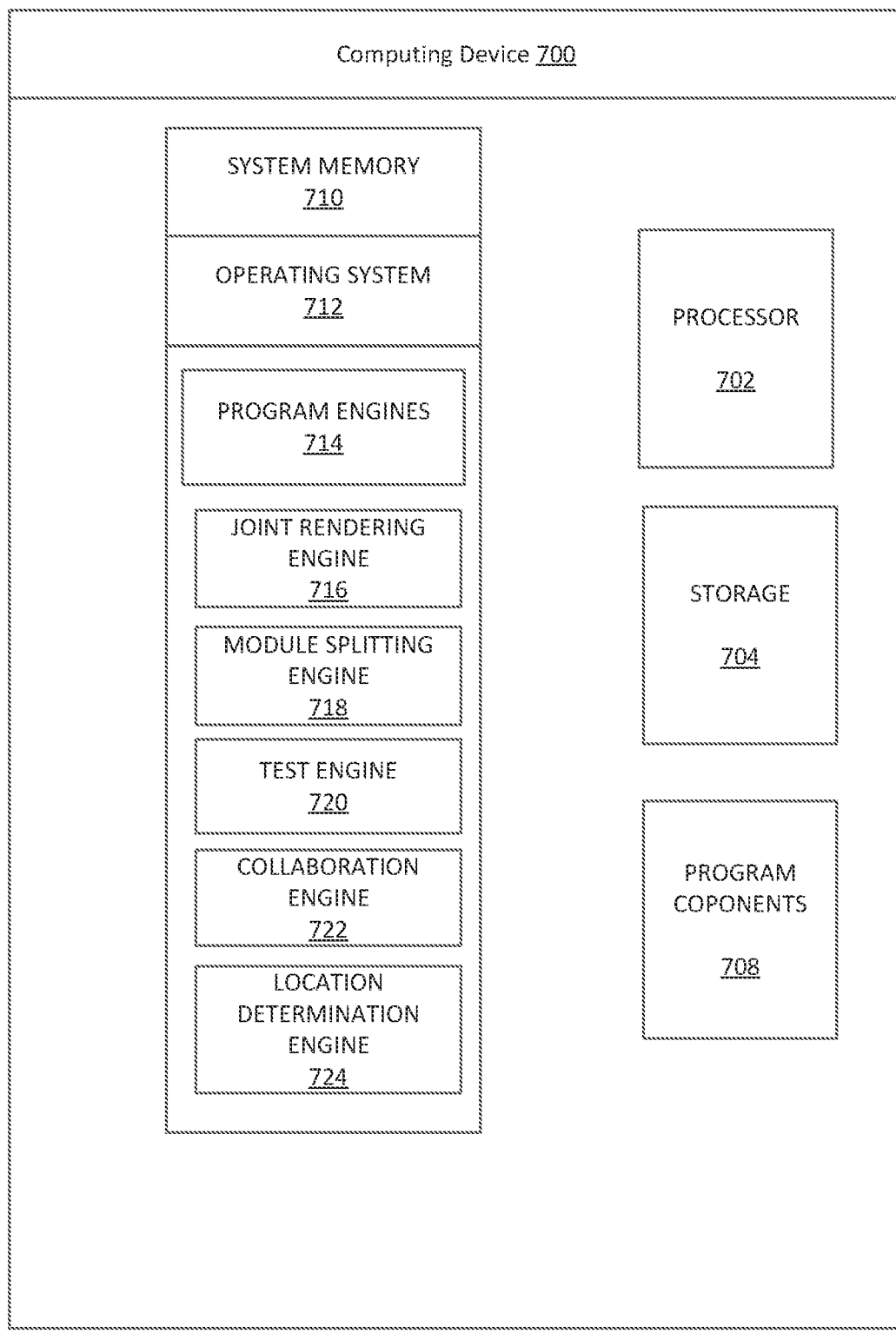
FIG. 7 is a block diagram illustrating physical components (e.g., hardware) of a computing device with which aspects of the disclosure may be practiced.

FIG. 7 is a block diagram illustrating additional physical components (e.g., hardware) of a computing device 700 with which certain aspects of the disclosure may be practiced. The computing device components described below may have computer executable instructions for: maintaining an object library comprising a plurality of objects, wherein each of the plurality of objects has at least one property that an automated control device operation can be programmed to act on, and wherein each of the plurality of objects has at least one property that a human machine interface component can utilize in generating display elements corresponding to the objects for display on a human machine interface.

Computing device 700 may perform these functions alone or in combination with a distributed computing network one or more additional computing devices which may communicate and process the one or more of the program engines in FIG. 7 including joint rendering engine 716, which may perform one or more operations associated with rendering a plurality of software modules corresponding to hardware components of an automated routine/process as a singular navigable unit; module splitting engine 718, which may perform one or more operations associated with splitting at least one software module off from a collaboratively rendered software module unit; test engine 720, which may perform one or more operations associated with testing ladder logic via one or more virtual industrial controllers; collaboration engine 722, which may perform one or more operations associated with allowing users to communicate and leave notes for one another in the development of industrial automation projects; and location determination engine 724, which may perform one or more operations associated with identifying a location in a software module that has been affected by a modification to a first software module.

In a basic configuration, the computing device 700 may include at least one processor 702 and a system memory 710. Depending on the configuration and type of computing device, the system memory 710 may comprise, but is not limited to, volatile storage (e.g., random access memory), non-volatile storage (e.g., read-only memory), flash memory, or any combination of such memories. The system memory 710 may include an operating system 712 and one or more program engines 714 suitable for facilitating object-based cross-domain industrial automation control, such as one or more components in regards to FIG. 6 and, in particular, joint rendering engine 716, module splitting engine 718, test engine 720, collaboration engine 722, and location determination engine 724. The operating system 712, for example, may be suitable for controlling the operation of the computing device 700. Furthermore, aspects of the disclosure may be practiced in conjunction with a graphics library, other operating systems, or any other application program and is not limited to any particular application or system.

The computing device 700 may have additional features or functionality. For example, the computing device 700 may also include additional data storage device (removable and/or non-removable) such as, for example, magnetic disks, optical disks, or tape. Such additional storage is illustrated in FIG. 7 by storage 704. It will be well understood by those of skill in the art that storage may also occur via distributed computing networks, which are not shown in FIG. 7.

As stated above, a number of program engines and data files may be stored in the system memory 710. While executing the processor 702, the program engines 714 (e.g., joint rendering engine 716, module splitting engine 718, test engine 720, collaboration engine 722, and location determination engine 724) may perform processes including, but not limited to, the aspects described herein.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A system for facilitating object-based cross-domain industrial automation control, the system comprising:
   a memory that stores executable components; and
   a processor, functionally coupled to the memory, that executes the executable components, the executable components comprising:
   an object library component configured to:
      maintain, in an object library, an object comprising a device property that an industrial control application utilizes to perform actions associated with an automated control device, and a visualization property that a human machine interface (HMI) application utilizes to generate a display element corresponding to the object; and
      in response to a modification of a property value of the object, automatically deploy a modified version of the object to the industrial control application and to the HMI application;
   the industrial control application functionally coupled to the object library component and configured to:
      incorporate the modified version into the industrial control application; and
      generate, based at least on the device property, control logic for a device operation; and
   the HMI application functionally coupled to the object library component and configured to:
      incorporate the modified version into the HMI application; and
      generate, based at least on the visualization property, display elements corresponding to the object.

2. The system of claim 1, wherein the automated control device comprises one of: a logic controller, and a virtual controller.

3. The system of claim 1, wherein the object is deployed in the industrial control application prior to the modification of the property value.

4. The system of claim 1, wherein the modification of the property value comprises an addition of a new feature to the object into an automated industrial process, and wherein the industrial control application is further configured to:
  in response to the addition of the new feature to the object, generate, based at least on the device property, a file for execution of at least an operation in the automated industrial process by the automated control device.

5. The system of claim 4, wherein the HMI application is further configured to:
  generate, based at least on the addition of the new feature to the object, a file for displaying a representation of the new feature on an automation visualization computing device.

6. The system of claim 4, wherein the HMI application is further configured to:
  enable display, based on the addition of the new feature to the object, of a representation of the new feature on an automation visualization computing device, wherein the representation corresponds to the visualization property.

7. The system of claim 1, wherein the industrial control application is further configured to, in response to receiving the modified version from the object library component, automatically deploy, based on the modified version, updated controller operations to the automated control device; and
  wherein the HMI application is further configured to, in response to receiving the modified version from the object library component, automatically deploy, based on the modified version, updated display properties.

8. A non-transitory computer-readable medium having stored thereon instructions that, in response to execution, cause a system comprising a processor to execute an object library component configured to:
  maintain, in an object library, an object comprising a device property that an industrial control application utilizes to perform actions associated with an automated control device, and a visualization property that a human machine interface (HMI) application utilizes to generate a display element corresponding to the object; and
  in response to a modification of a property value of the object, automatically deploy a modified version of the object to the industrial control application;
  wherein the industrial control application is functionally coupled to the object library component and configured to:
    incorporate the modified version into the industrial control application; and
    generate, based at least on the device property, control logic for a device operation; and
  wherein the HMI application is functionally coupled to the object library component and configured to:
    incorporate the modified version into the HMI application; and
    generate, based at least on the visualization property, display elements corresponding to the object.

9. The non-transitory computer-readable medium of claim 8, wherein the automated control device comprises one of: a logic controller and a virtual controller.

10. The non-transitory computer-readable medium of claim 8, wherein the object is deployed in the industrial control application prior to the modification of the property value.

11. The non-transitory computer-readable medium of claim 8, wherein the modification of the property value comprises an addition of a new feature to the object into an automated industrial process, and wherein the industrial control application is further configured to:
  in response to the addition of the new feature to the object, generate, based at least on the device property, a file for execution of at least an operation in the automated industrial process by the automated control device.

12. The non-transitory computer-readable medium of claim 11, wherein the HMI application is further configured to:
  generate, based at least on the addition of the new feature to the object, a file for displaying a representation of the new feature on an automation visualization computing device.

13. The non-transitory computer-readable medium of claim 11, wherein the HMI application is further configured to:
  enable display, based on the addition of the new feature to the object, of a representation of the new feature on an automation visualization computing device, wherein the representation corresponds to the visualization property.

14. The non-transitory computer-readable medium of claim 8, wherein the industrial control application is further configured to, in response to receiving the modified version from the object library component, automatically deploy, based on the modified version, updated controller operations to the automated control device; and
  wherein the HMI application is further configured to, in response to receiving the modified version from the object library component, automatically deploy, based on the modified version, updated display properties.

15. A method for facilitating object-based cross-domain industrial automation control, comprising executing an object library component configured to:
  maintain, in an object library, an object comprising a device property that an industrial control application utilizes to perform actions associated with an automated control device, and a visualization property that a human machine interface (HMI) application utilizes to generate a display element corresponding to the object; and
  in response to a modification of a property value of the object, automatically deploy a modified version of the object to the industrial control application;
  wherein the industrial control application is functionally coupled to the object library component and configured to:
    incorporate the modified version into the industrial control application; and
    generate, based at least on the device property, control logic for a device operation; and
  wherein the HMI application is functionally coupled to the object library component and configured to:
    incorporate the modified version into the HMI application; and
    generate, based at least on the visualization property, display elements corresponding to the object.

16. The method of claim 15, wherein the automated control device comprises one of:
  a logic controller and a virtual controller.

17. The method of claim 15, wherein the object is deployed in the industrial control application prior to the modification of the property value.

18. The method of claim 15, wherein the modification of the property value comprises an addition of a new feature to the object into an automated industrial process, and wherein the industrial control application is further configured to:

in response to the addition of the new feature to the object, generate, based at least on the device property, a file for execution of at least an operation in the automated industrial process by the automated control device.

19. The method of claim 18, wherein the HMI application is further configured to:

generate, based at least on the addition of the new feature to the object, a file for displaying a representation of the new feature on an automation visualization computing device.

20. The method of claim 18, wherein the HMI application is further configured to:

enable display, based on the addition of the new feature to the object, of a representation of the new feature on an automation visualization computing device, wherein the representation corresponds to the visualization property.

* * * * *